United States Patent [19]

Wheadon et al.

[11] 3,881,952
[45] May 6, 1975

[54] LEAD-ACID BATTERY PLATES WITH EXPANDED LEAD SHEET GRIDS

[75] Inventors: Ellis G. Wheadon; Norman L. Willmann, both of Anderson, Ind.

[73] Assignee: General Motors Corporation, Detroit, Mich.

[22] Filed: Sept. 20, 1973

[21] Appl. No.: 398,975

[52] U.S. Cl. .................................. 136/26; 136/36
[51] Int. Cl. ............................................ H01m 35/04
[58] Field of Search .......................... 136/36–41, 136/48–49, 50–52, 35, 64, 66–67, 26–27, 9; 29/6.1, 6.2, 193.5; 52/635, 670, 672; 72/187, 198, 203, 366, 392

[56] References Cited
UNITED STATES PATENTS

| | | | |
|---|---|---|---|
| 2,275,194 | 3/1942 | Sizelove | 136/36 X |
| 2,909,586 | 10/1959 | Hagspihl | 136/36 X |
| 3,099,899 | 8/1963 | Horn et al. | 136/57 X |
| 3,310,438 | 3/1967 | Huffman et al. | 136/36 |
| 3,607,411 | 9/1971 | Brownrigg | 136/37 |
| 3,702,265 | 11/1972 | Snyder et al. | 136/26 |

*Primary Examiner*—Anthony Skapars
*Attorney, Agent, or Firm*—Lawrence B. Plant

[57] ABSTRACT

A Faure-type lead-acid storage battery plate including a grid expanded from a lead sheet and having a current-collecting header of unexpanded sheet and a reticulated portion expanded, guillotine style, from the sheet into a plurality of paste-retaining cells bounded by skeletal elements and nodes formed during expansion. The skeletal elements and nodes extend in opposite directions through the paste from substantially one face of the plate to the other yet still provide paste continuity from one cell to the next. The nodes are twisted and partially flattened during processing to provide flat sides or plateaus on the nodes which lay in planes parallel to the principal planes of the pasted plate, which plateaus are spaced apart by a distance greater than the thickness of the header but substantially less than twice the thickness of the header.

3 Claims, 9 Drawing Figures

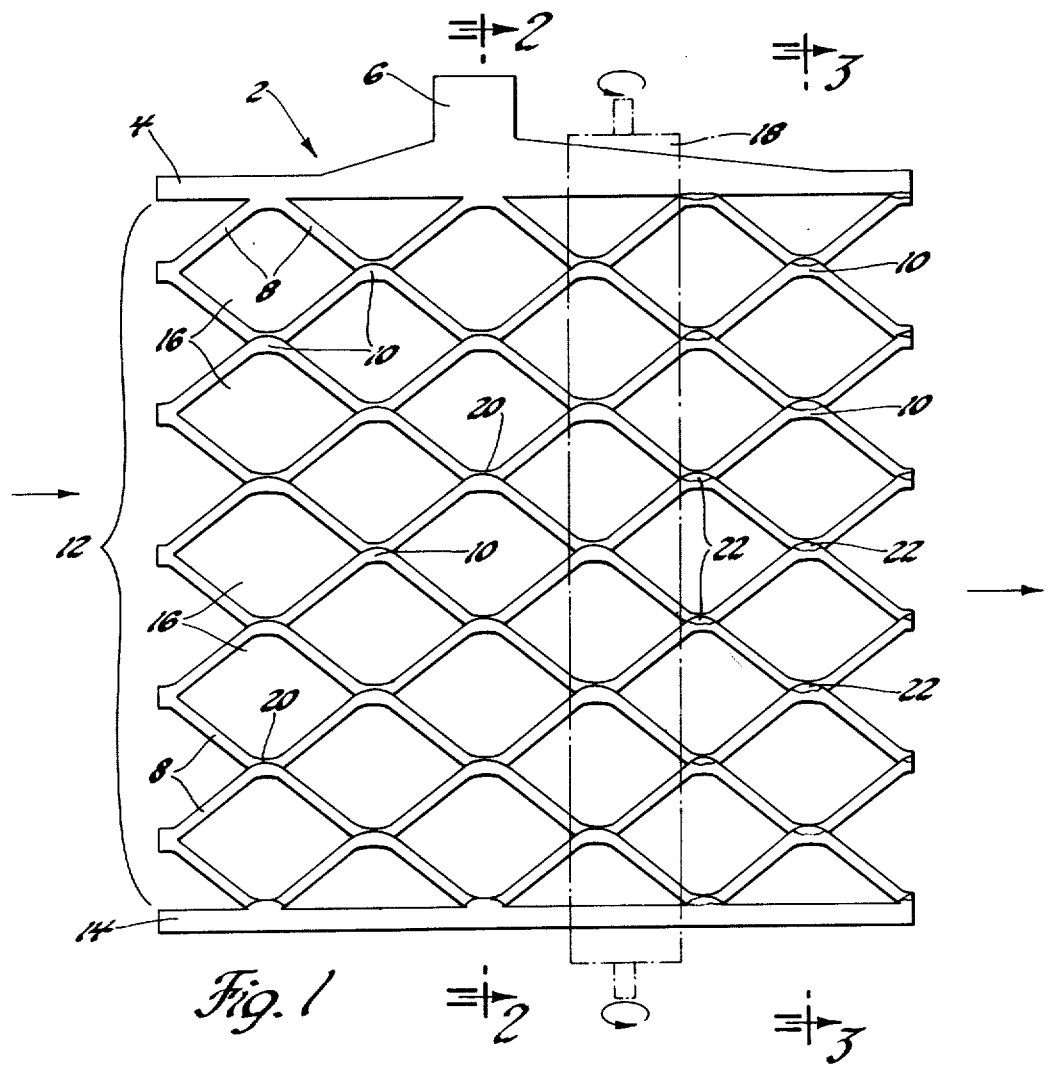
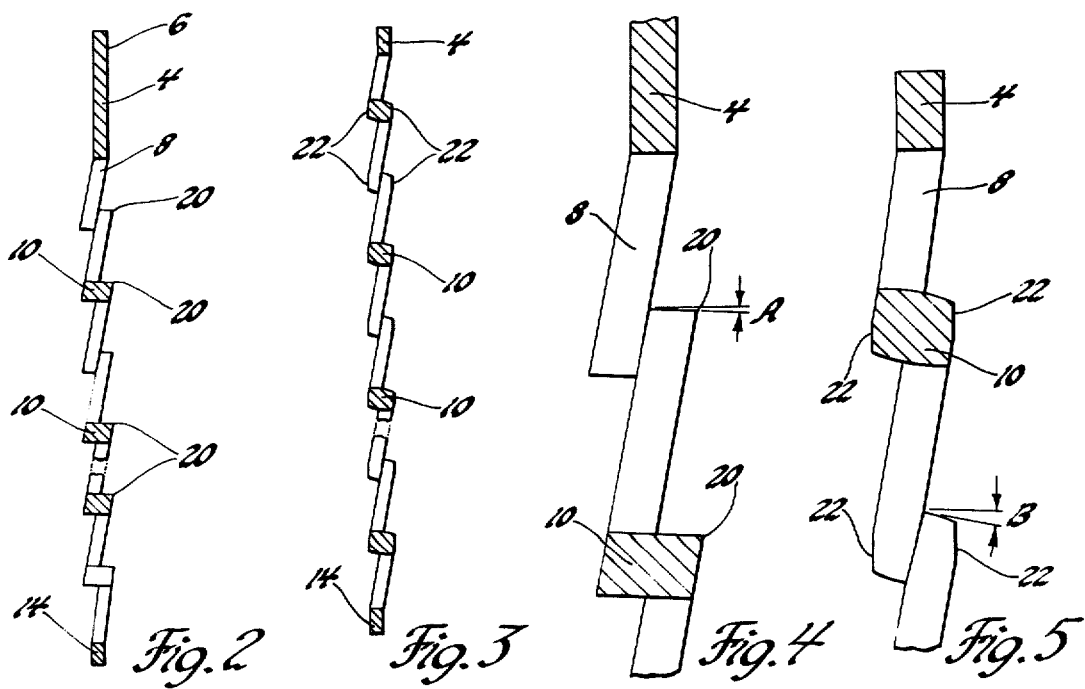

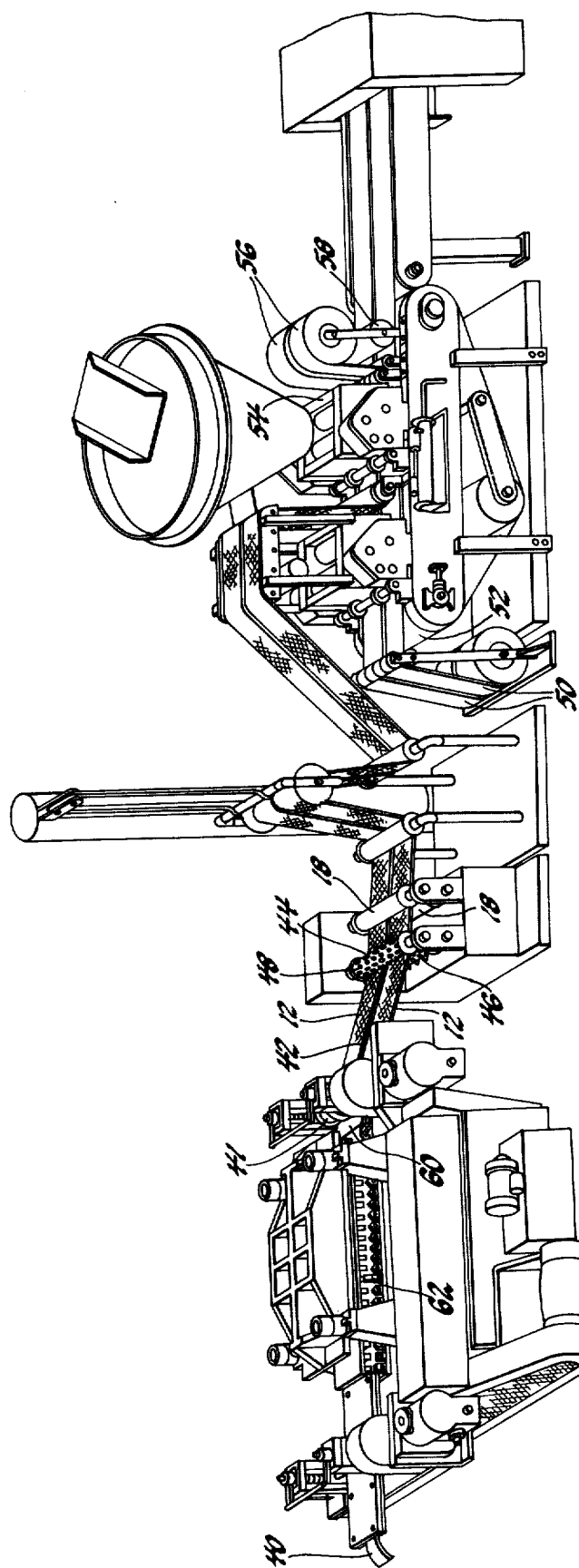

LEAD-ACID BATTERY PLATES WITH EXPANDED LEAD SHEET GRIDS

Commercial, automotive lead-acid storage battery plates have heretofore been largely made by casting techniques in which a pair of interconnected grids are cast in a single mold using lead alloys containing about 3 – 7 percent antimony to improve the castability of the lead. The grid pairs are subsequently handled as a discrete unit through pasting and a number of the remaining processing operations. Casting of grids in this manner is slow, requires skilled labor working in a hot environment, and the plates made therefrom are subsequently subjected to considerable rough in-plant handling. Moreover, the antimony needed for castability produces undesirable side effects in the finished battery. It has been proposed to make plates by expanding, guillotine fashion, a strip of sheet lead alloy in successive advances between slitting and stretching dies such that short interconnected skeletal segments are peeled away from the leading edge of the strip to form a tiered structure of polygonal paste-retaining cells. Despite the potential advantages, this technique has not been substantially used in the manufacture of lead-acid batteries.

The present invention provides a Faure-type (i.e., pasted) lead-acid storage battery plate having a conventional leady active material paste embedding a grid expanded from a sheet of lead by the guillotine method, which plate is nevertheless satisfactory for commercial manufacture and customer use. The grids of this invention are useful with both positive and negative plates and accordingly by the term "leady" active materials is meant the lead, lead oxide and lead sulfate forms conventionally found in lead-acid batteries. Similarly, the term "lead" sheet is intended to include not only pure lead but also those typical lead alloys found in conventional lead-acid battery grids, especially the non-antimonial lead alloys and particularly the lead calcium alloys.

In brief, the plate is composed of a paste-supporting skeleton of expanded sheet lead having an unexpanded, current-collecting top header portion and an expanded reticulated portion depending from the header. The reticulated portion includes a plurality of thin wire-like skeletal elements emanating from nodes which interconnect the several skeletal elements and are substantially thicker than the skeletal elements. Each node angles through the paste an at angle nearly normal to the plane of the plate and has a thickness which is greater than the thickness of the original sheet lead from which it was derived, is substantially less than twice the thickness of that sheet lead, and has flat surfaces or plateaus laying in the principal planes of this grid. More particularly, after the expansion step, the grid is conditioned so as to angularly orient the node by rotating it slightly and concurrently flatten those salient edges of the node which, by virtue of the node rotation, would otherwise project from the opposed faces of the grid. The flattening of the salient edges from the nodes changes the substantially rectangular vertically transverse cross-section of the as-expanded node to a polygonal cross-section having two opposed, substantially parallel sides which lay in the principal planes (i.e., the faces) of the grid, and are spaced apart one from the other by a distance greater than the thickness of the header sheet but less than twice that thickness. The skeletal elements diverge from each node so as to angle from one face of the grid to the other, but in opposite directions to the nodes from which they emanate so as to provide support for the subsequently applied paste over substantially the entire thickness of the pasted plate. The opposite angling of the nodes and skeletal elements insures continuity of the paste between adjacent, paste-retaining, polygonal cells.

It is therefore an object of the present invention to provide an improved commercially acceptable, Faure-type lead-acid storage battery plate in which expanded and conditioned sheet lead defines the paste-supporting grid.

More specifically, it is an object to provide a commercially acceptable lead-acid storage battery plate wherein the peculiarities of the complex bent shape formed by guillotine-type sheet lead expansion are used to advantage in providing oriented and flattened nodes thicker than the original sheet metal and skeletal elements diagonally disposed substantially throughout the paste thickness to contact and support the paste without substantially interrupting the continuity of the paste between adjacent paste-retaining cells while at the same time avoiding detrimental plate deterioration in use.

These and other objects and advantages will be more readily apparent from the detailed description which follows in which:

FIG. 1 is a front elevational view of an expanded lead sheet grid used with the plate of the present invention;

FIG. 2 is a side view in the direction 2–2 vertically transverse the grid of FIG. 1, before modification;

FIG. 3 is a side view in the direction 3–3 vertically transverse the grid of FIG. 1, after modification;

FIG. 4 is an enlargement of the uppermost portion of FIG. 2;

FIG. 5 is an enlargement of the uppermost portion of FIG. 3;

FIG. 9 is a perspective view of apparatus for continuously making grids according to this invention.

Figure 6:
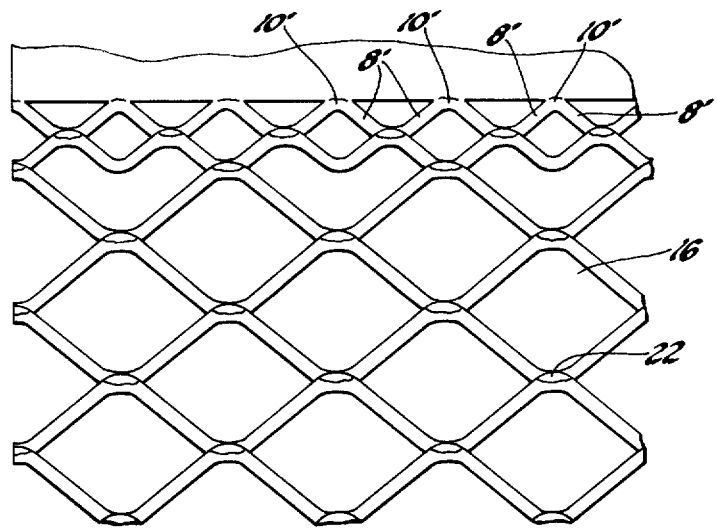
FIG. 6 is a front elevational view of the upper portion of another embodiment of an expanded lead sheet grid made in accordance with the present invention.

The invention comprehends in features of construction, combination, and arrangement wherein commercially acceptable lead-acid storage battery plates are achieved by a low cost and reliable mass manufacture technique. More specifically, a preferred form of this invention comprehends a Faure-type lead-acid storage plate having a grid expanded from lead sheet by the guillotine method so as to have a current-collecting header 4 and lugs 6 of unexpanded sheet and a reticulated paste-supporting portion 12 expanded from the sheet into a plurality of polygonal paste-retaining cells 16 depending from the header. The paste-retaining cells are defined by wire-like skeletal elements 8 connected one to the other by oriented, cross-sectionally (i.e., vertically transverse) polygonal nodes 10, each node having at least two substantially parallel flat plateaus 22 laying in the principal faces of the grids. The plateaus 22 are spaced from each other by a distance at least about 1.3 times the thickness of the lead sheet from which the reticulated portion 12 was expanded and the header 4 formed. Both the skeletal elements 8 and nodes 10 extend diagonally through the thickness of the plate, but in respectively opposite directions as in Z-fashion, thereby providing continuity between the paste from one cell to the next and enhancing paste retention to the grid.

The nodes thus described are formed by expanding lead sheet according to the guillotine method of expansion such as disclosed in Curtis Pat. No. 1,482,600, whereby a plurality of skeletal element tiers are formed which extend substantially perpendicular to the lead sheet from which they are punched. The several tiers are connected to the next adjacent tiers via nodes 10 which comprise unslit and unstretched portions of the sheet intermediate the skeletal elements of each tier, the said nodes being about twice the width of the skeletal elements joining to form the node. Lead sheets useful with this technique vary in thickness from about 0.035 to about 0.05 inch. The thinner sheets are used primarily in negative plates and the thicker sheets in positive plates. The width of the skeletal elements varies between about 0.025 inch for very open reticulated portions (i.e., 1.4 cells/in.$^2$) and about 0.08 inch. Skeletal element cross-sectional areas of at least about 0.0012 sq. in. are considered necessary upwards of the grids's center. Considerably thicker elements are needed near the header for positive grids, both for conductivity and corrosion resistance reasons.

Following expansion, and without substantially affecting the nodes, the reticulated portion is gradually laid down into substantially the same plane as the lead sheet from which it was punched, with the nodes 10 laying at a slight angle (i.e. about 2°–4°) to that plane. This is followed by uniformly stretching each tier in a direction directly away from the header, which stretching action slightly rotates the nodes 10 and makes the paste-retaining cell more equiaxed by elongating the minor axis of the cell (i.e., perpendicular to the header) and shortening the major axis of the cell (i.e., parallel to the header). For negative plates having large cell areas in proportion to grid metal, a minor to major axis ratio of at least about 0.7 is preferred, while for positive plates having smaller cells and more grid metal, a minor to major axis ratio of at least about 0.9 is preferred to assist in reducing vertical grid growth. As a result of this stretching, the total reticulated portion is extended by an amount equal to the summation of the increase in length of the minor axes of the cells in each of the several tiers making up the grid.

Following stretching, the reticulated portion 12 is next passed through a set of rollers 18 in the direction of the major axis or, in other words, in a direction 90° to the direction of expansion. This in combination with carefully controlled spacing between rollers, causes still further rotation of the nodes to between about six and fifteen degrees and concurrently flattens into plateaus the outwardly projecting or salient edges of the nodes which had rotated to the outward faces of the grid. As a result, the otherwise substantially rectangular cross-section of the as-expanded node 10 is changed to a polygonal cross-section (see FIG. 5) in which the flattened portions or plateaus 22 of the nodes 10 lay in the principal faces of the grid and are spaced from each other by a distance at least about 1.3 times, but substantially less than two times, the thickness of the header sheet 4. By this twisting and flattening, each node is significantly mechanically worked causing some flow and bulging of the node, but in a manner which is not so severe or harsh as to significantly damage the reticulated portion and shorten the useful life of plates made therefrom.

Commercial acceptability and in-use life and reliability is insured by including small (i.e., one-eighth - one-fourth inch) lengths of inert fiber (e.g., Dynel) in the pastes. This is necessary for the very large cell grids used with negative plates, and preferred with the smaller cell grids normally used for the positive grids. When fibers are used, they will generally be used in concentrations of less than about 0.5 percent by weight and preferably about 0.25 percent by weight. Higher than normal density pastes (i.e., about 140 ± 5 g/2 in.$^3$ drop weight) are preferred to match grid growth to paste growth. Otherwise, the chemistry of both the positive and negative pastes remains the same as conventionally found in lead-acid batteries. One such paste is disclosed in Snyder et al. U.S. Pat. No. 3,702,265, issued Nov. 7, 1972, and assigned to the assignee of the present invention.

With more particular reference to the drawings, FIG. 1 shows grid blank 2 comprising a header 4 having a lug 6. The single grid blank shown has previously been expanded, laid flat and stretched as described above. These operations are preferably carried out on continuous strips expanded in opposite directions from the longitudinal edges of the strip and the single grids then cut from the strip. A plurality of skeletal elements 8 and nodes 10 depend from the header 4 making up the reticulated portion of the grid generally indicated at 12. A bottom border 14 may be provided to prevent warpage of the grid-making strips during the expansion process and to support the plate on the bridges at the bottom of the battery case. The skeletal elements 8 and the nodes 10 making up the reticulated portion 12 define a plurality of polygonal paste-retaining cells 16. The already expanded and stretched grid blank 2 is depicted as moving from left to right between compression rollers 18 (top roller shown in phantom), which mechanically work the nodes 10 rotating them about an axis parallel to the header 4 and flattening the salient upstanding edges 20 of the as-expanded grid to form plateaus 22 on the as-rolled grid. In this regard, FIGS. 2 and 4 depict the as-expanded grid blank 2 prior to rolling and shows the salient edges 20 of the nodes 10 and the slight angle A that the node 10 bears to the principal planes of the grid blank 2. FIGS. 3 and 5 depict the grid blank 2 after rolling and shows the increased angle B resulting from the rotation of the node as well as the flattening of the edges 20 into plateaus 22. Hence, what was initially a substantially cross-sectionally rectangular node 10 prior to rolling is transformed, after rolling, into a cross-sectionally polygonal node by the addition of two sides which are the parallel plateaus 22. In addition, the working of the node 10 causes it to bulge or round a bit as best shown in FIG. 5. The overall affect of the rolling then rotates the nodes, works the metal thereof and provides two opposed plateaus 22 which are separated one from the other by a distance which exceeds the thickness of the header 4 but is substantially less than twice that thickness. The distance between the plateaus formed during rolling fixes the thickness of the grid and the principal planes of the grid are those planes which include the plateaus 22. Flush pasted grids will be pasted to this thickness, i.e., between the plateaus 22 (see FIG. 7).

while over pasted plates (not shown) will have the paste extending somewhat beyond the principal planes of the grid.

Figure 7:
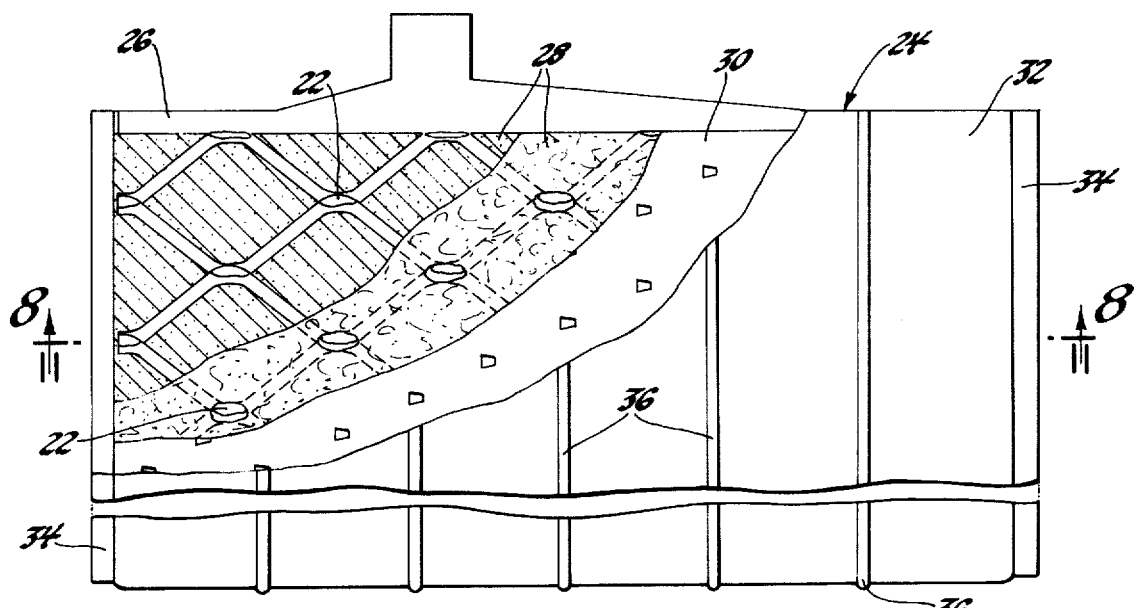
FIG. 7 is a partially broken-away front elevational view of a separator-encapsulated, paper-bound, battery plate of the present invention.

FIG. 6 depicts an embodiment useful with the present invention which is primarily directed toward expanded lead grids which are intended for use in negative plates. Negative plates are inherently conductive and therefore require only enough grid lead to give strength to the grid and supplement its inherent conductivity. As a result, negative grids can be made with very substantially less lead and significantly larger paste-retaining cells 16 than is required for positive plates. Plan view areawise, this results in a low cell density of large cells such as shown in FIG. 7. A typical such negative grid might have about 1.4 cells per $in^2$ of grid with each cell having an area of at least about 0.5 $in^2$. With such grids the number of contact points between the reticulated portion 12 and the header 4 can be as few as four, which are too few for a good strong plate. As a result, there is a tendency for the reticulated portions 12 of such open grids to pull away from the header 4 under the weight of the paste and in-plant handling and subsequent use of the grid. The embodiment shown in FIG. 6 provides greater a concentration of skeletal elements 8' and header contact points 10' in the weak areas of the negative grid which not only improves its strength, but also reduces slightly the IR drop of the plate. Otherwise the grid remains substantially the same as discussed earlier.

Figure 8:
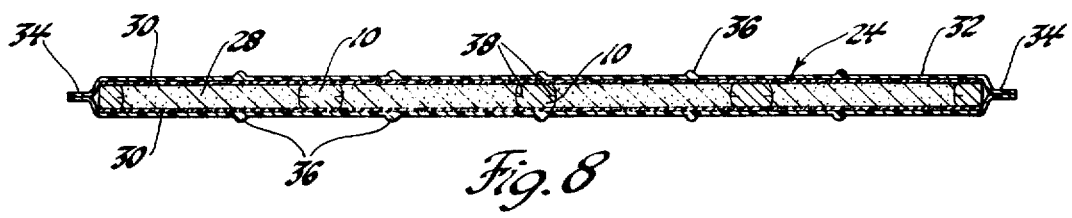
FIG. 8 is a bottom view in the direction 8–8 of FIG. 7.

FIGS. 7 and 8 depict a unit assembly 24 particularly useful with positive grids of this invention. The unit assembly 24 includes a positive grid 26 which in actual practice would have a higher cell density than actually shown. A typical cell density for a positive grid would be at least about four cells per $in^2$ of a reticulated portion 12. This grid 26 would have its header, lug, skeletal elements, nodes and plateaus formed in the manner discussed above and have its reticulated portion embedded in a fiber-laden (e.g. Dynel, polypropylene, etc.) paste 28. This grid 26 is flush pasted by forcing the paste into the grid between two strips of perforated paper (here shown as sheets 30) such as disclosed in U.S. Pat. application Ser. No. 347,326 filed in the name of Morris E. Adams on Apr. 2, 1973 and assigned to the assignee of the present invention. Alternatively, the grid strip is pasted with the paper strips using a more conventional belt pasting technique as is well known in the art. The paper-bound pasted strip is then cut into individual plates and, after appropriate curing, etc. as may be required, enclosed in a conventional battery separator 32 (e.g., sintered polyvinyl chloride). This is most conveniently accomplished by folding the separator around the bottom of the pasted grid 26 and heat sealing the lateral edges 34 thereof. Spacing ribs 36 on the outside of the separator 32 provide space between the assembly 24 and the negative plate to permit a more efficient circulation of the electrolyte through the cell group. FIG. 8 also depicts the small fracture 38 which usually forms and extends into the nodes 10 during the expansion process and which, if severely extended during processing of the grid, can cause premature failure of the plate in use.

In a specific example of the invention, negative grids were made by expanding a 2.38 inch wide, 0.04 inch thick ribbon of lead-calcium-tin alloy (0.065% Ca, 0.7% Sn). An inverted, Curtiss-like, in-line continuous expander (see FIG. 9) was used to expand the ribbon 40 upwardly from both longitudinal edges so as to produce two expanded, reticulated portions joined by a common unexpanded portion 42. Skeletal elements having a width of 0.05 inch were punched and stretched from the ribbon and were joined by nodes having a width of 0.1 inch. Ten tiers of skeletal elements and a bottom border were provided so as to yield a grid having 34 cells per 5 × 5 ½inch reticulated portion. After expansion the grid strip was passed beneath a pair of plows (not shown) which gently fold the reticulated portion down to a position more nearly in the plane of the unexpanded center portion but with a slight hump where the reticulated portion joins the unexpanded portion. This is followed by leveling out the hump by passing the strip beneath an outwardly beveled roller 40 which presses the humps downwardly and more nearly into the plane of the unexpanded portion. The strip is next passed between a pair of forming rollers 44 which stretch the reticulated portions in a direction 90° from the unexpanded portion and increased this dimension of the reticulated portions by about one-fourth inch. The forming rolls included an embossed upper roll having a plurality of truncated pyramidal projections 46 for engaging each of the cells of the grid to stretch the grid uniformly. The opposing roll 48 had a polyurethane foam outer layer with holes adapted to receive the projections and press the skeletal elements and nodes to the base of the projections to form the cells about the projections and stretch the reticulated portion. From the stretching/forming rolls, the grid strip is passed between flattening rolls 18, discussed above, where the slightly canted nodes are rotated and their salient edges flattened into plateaus which are 0.055 inch apart. Hence, an overall node reduction from about 0.1 inch to about 0.055 inch is effected. The reticulated portions are next pasted by laying them on top of strips of perforated paper 50 (e.g., see Adams Ser. No. 347,326), on a continuous belt 52, passing it under a paste-dispensing apparatus 54 adapted to press the paste around the skeletal elements from one side of the grid, covering it with a second layer of paper 56 and finally rolling (see rollers 58) it to a predetermined finished thickness of about 0.065 inch.

The plate of the present invention is characterized by a high degree of commercial acceptability. In this regard, the plate is inexpensively produceable: (1) on a continuous strip basis with excellent thickness control over a wide range of grid and plate thickness; (2) utilizing easily operated and maintained equipment; (3) from a variety of lead alloys including the hard-to-cast non-antimonial alloys; (4) over a wide range of grid metal content; and (5) with excellent paste continuity and retention throughout the plate.

While we have disclosed our invention in terms of specific embodiments thereof, we do not intend to be limited thereto, but rather only to the extent set forth hereafter in the claims which follow.

We claim:

1. A lead-acid storage battery plate of the Faure-type comprising:

a paste-supporting skeleton of lead material defining a flat, top current-collecting header of sheet lead having a predetermined thickness and an upstanding connector lug, a reticulated portion depending from the header over substantially the entire length thereof and including a plurality of nodes from which skeletal elements project to define a plurality of nearly equiaxed polygonal, paste-retaining cells, said nodes angling from one face of the reticulated portion to the other face thereof and having a polygonal cross-section in the vertical transverse plane with two opposing sides of each polygon in planes substantially parallel to the faces of the pasted plate and spaced one from the other by a distance greater than said predetermined thickness but substantially less than twice said predetermined thickness, and said skeletal elements angling from one side of each node to the opposite side of the adjacent node to which it connects; and a leady active material paste embedding the reticulated portion of the skeleton and together therewith defining a substantially flat plate having substantially parallel faces and a thickness at least equal to the distance between said opposing sides of said nodes whereby the skeletal elements angle through and are substantially covered by the paste and support the same over substantially the entire thickness thereof without substantially interrupting continuity of the paste from one polygonal paste-retaining cell to the next.

2. A lead-acid storage battery plate of the Faure-type comprising:

a paste-supporting skeleton of lead material defining a flat, top current-collecting header of sheet lead having a predetermined thickness and an upstanding connector lug, a reticulated portion depending from the header over substantially the entire length thereof and including a plurality of nodes from which skeletal elements project to define a plurality of polygonal, paste-retaining cells having minor and major axes respectively perpendicular and parallel to said header and a minor to major axis ratio of at least about 0.7, said nodes angling from one face of the reticulated portion to the other face therethrough and having polygonal cross-sections in the vertical transverse plane with two opposing sides of each polygon in planes substantially parallel to the faces of the pasted plate and spaced one from the other by a distance greater than said predetermined thickness but substantially less than twice said predetermined thickness, and said skeletal elements angling from one side of each node to the opposite side of the adjacent node to which it connects; and a leady active material paste embedding the reticulated portion of the skeleton and together therewith defining a substantially flat plate having substantially parallel faces and a thickness at least equal to the distance between said opposing sides of said nodes whereby the skeletal elements angle through and are substantially covered by the paste and support the same over substantially the entire thickness thereof without substantially interrupting continuity of the paste from one polygonal paste-retaining cell to the next.

3. A negative lead-acid storage battery plate of the Faure-type comprising:

a paste-supporting skeleton of lead material defining a flat, top current-collecting header of sheet lead having a thickness of about 0.04 inch and an upstanding connector lug, a reticulated portion depending from the header over substantially the entire length thereof and including a plurality of nodes from which skeletal elements project to define a plurality of rows of polygonal paste-retaining cells having minor axes extending substantially perpendicular to and major axes substantially parallel to said header, said nodes angling from one face of the reticulated portion to the other face thereof and having a polygonal cross-section in the transverse plane with two opposing sides of each polygon in planes substantially parallel to the faces of the pasted plate and spaced one from the other by a distance of about 0.055 inch, said skeletal elements angling from one side of each node to the opposite side of the adjacent node to which it connects and each having a transverse cross-sectional area of at least 0.0012 in.$^2$ nearer the header, and said cells each having a paste-retaining area of about 0.5 in.$^2$ with a minor to major axis ratio of about 0.7 substantially throughout the reticulated portion; and a fiber-laden active material paste embedding the reticulated portion of the skeleton and together therewith defining a substantially flat plate having faces substantially paralleling said opposing sides of said nodes and a thickness of about 0.065 inch whereby the skeletal elements and nodes zigzag through and are substantially covered by the paste so as to support the same over substantially the entire thickness thereof without substantially interrupting the continuity of the paste from one polygonal cell to the next.

* * * * *